March 6, 1945.   J. SCHAUB   2,370,920
MOLDING APPARATUS
Filed Oct. 21, 1940   3 Sheets-Sheet 1

INVENTOR.
JACOB SCHAUB, Deceased
By BETTY A. SCHAUB, Executrix
BY
ATTORNEY.

March 6, 1945.  J. SCHAUB  2,370,920
MOLDING APPARATUS
Filed Oct. 21, 1940  3 Sheets-Sheet 2

INVENTOR.
JACOB SCHAUB, Deceased
By BETTY A. SCHAUB, Executrix
M Philip Churchill
ATTORNEY.

March 6, 1945.  J. SCHAUB  2,370,920
MOLDING APPARATUS
Filed Oct. 21, 1940  3 Sheets-Sheet 3

INVENTOR
JACOB SCHAUB, Deceased
By BETTY A. SCHAUB, Executrix
BY
ATTORNEY

Patented Mar. 6, 1945

2,370,920

UNITED STATES PATENT OFFICE 2,370,920

MOLDING APPARATUS

Jacob Schaub, deceased, late of Westfield, N. J., by Betty A. Schaub, executrix, Westfield, N. J., assignor, by mesne assignments, to The Best Foods, Inc., New York, N. Y., a corporation of New Jersey Application October 21, 1940, Serial No. 362,175

5 Claims. (Cl. 99—244)

This invention relates to apparatus and method for preparing molded congealed products such as margarine, shortening compounds and the like.

In the manufacture of margarine as heretofore practiced, an emulsion of oil and water has been congealed in a thin film on a chilled roll, the film scraped from the roll and the plastic material thus obtained worked and salted to produce a high quality product having a uniform smooth texture. This product, after working, has been molded in the plastic or solid condition to the form of blocks of suitable shape and size for retail sale. Such a batch process is lengthy and time consuming.

In view of the number of entirely different operations required by this process, attempts have been made to produce high quality margarine products continuously by chilling an emulsion of oil and water until it is super-cooled, and allowing this super-cooled emulsion to solidify as it moves slowly through a long chamber. The solidified material has been extruded directly from this solidifying chamber in the form of a continuous rod or bar that is cut off into blocks of the proper size.

Such proposals, however, have not been as successful as might be expected, for the reason that the emulsion tends to solidify rapidly after it has been super-cooled, unless it is maintained in a constant state of agitation. The hardening product in the solidifying chamber has a tendency to solidify in layers or stratify and, in addition, it sets up a high back pressure which requires the forcing of the liquid emulsion through the cooling chamber under high pressures. As a result, the emulsion hardens in the cooling chamber reducing the size of the passageway for liquid, forming lumps and occasionally blocking completely the passageway to the solidifying chamber.

One object of this invention is to overcome these difficulties by providing a continuous process in which super-cooled liquid emulsion or a similar fatty product is flowed continuously and directly into a molding apparatus, and the super-cooled liquid is allowed to solidify and harden in separate molds to produce blocks of the proper size and shape.

A further object of this invention is to provide such a molding apparatus and method whereby greater accuracy can be obtained in the molding of the product to the proper size and weight than has been obtained heretofore in the molding of the solid material.

Another object is to provide apparatus and method for solidifying a super-cooled liquid emulsion in a plurality of separate molds in such a manner that a continuous stream of the liquid can be supplied to the molds successively from a cooling chamber without creating a high back pressure on the cooling chamber.

Further objects and advantages of the invention will be apparent from the following description of one embodiment of the invention illustrated in the accompanying drawings, in which Figure 1 is a side elevation of a cooling chamber connected to molding apparatus with the upper portion of the molding apparatus shown in section.

Figure 1:
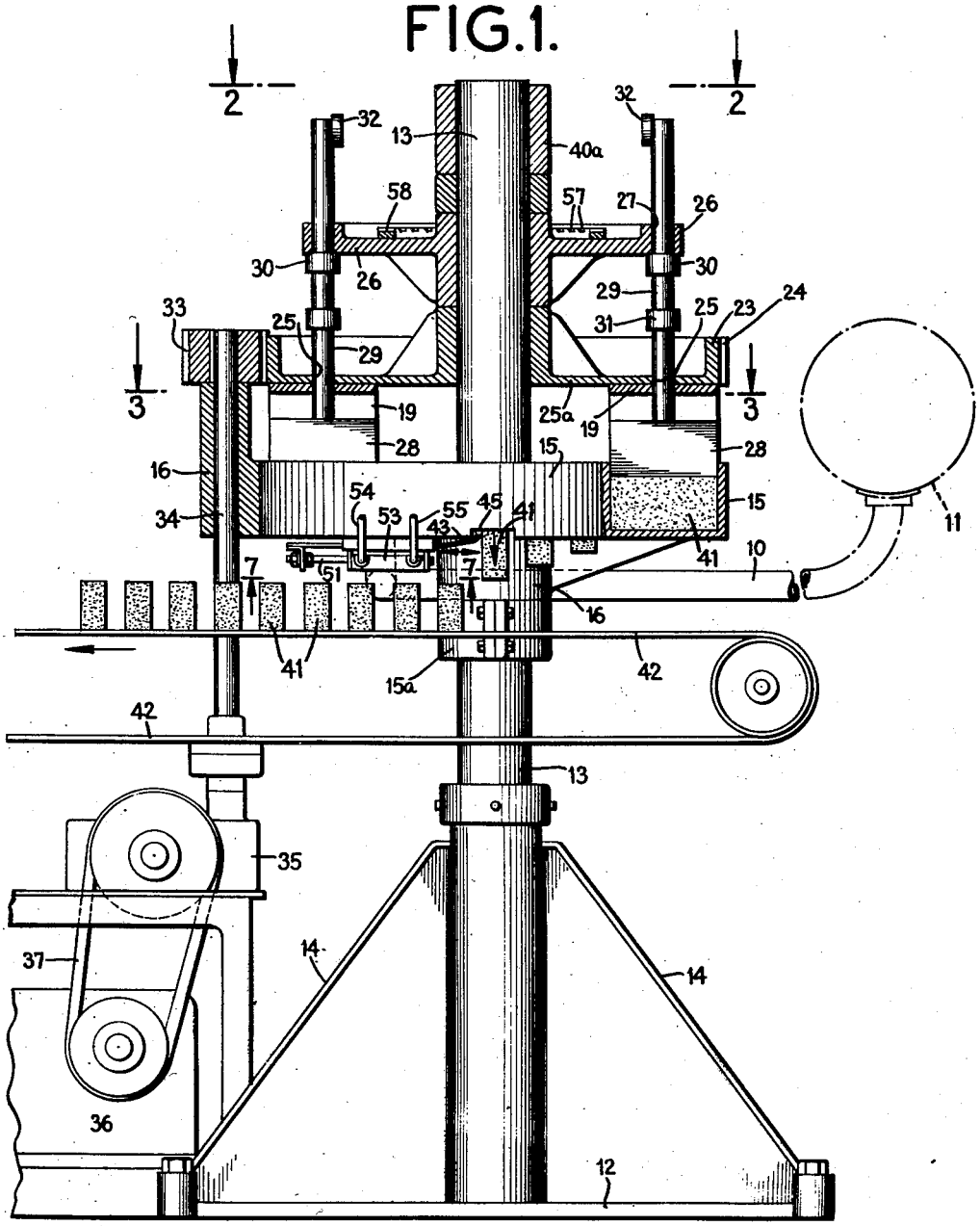

The molding apparatus of this invention is designed to receive a continuous stream of a fatty product in the form of a super-cooled liquid through the pipe 10 from the freezer or other chilling apparatus 11. The chilling apparatus 11, for example, may be the type of freezer illustrated and described in the application of Jacob Schaub, Serial No. 282,019, filed June 30, 1939, or any other suitable type of chilling apparatus for cooling an emulsion of oil and water below its melting point without allowing the material to solidify.

The molding apparatus comprises a suitable base 12 supporting a central column 13 which may be braced by means of the supports 14. Fixed to the column 13 by means of the collar 15a is an annular trough-shaped plate member 15 with a suitable bearing 16 formed integral therewith and projecting from one side of the plate. The trough-shaped plate 15 preferably has a portion of its lower wall cut away at 17 to form an opening in its under surface. The feed pipe 10 for delivering chilled liquid may be attached to the lower wall of the trough member 15 at one side of this opening by means of the flange 18.

Arranged for rotation within the trough-shaped plate 15 is a one-piece mold cavity block 19, provided with radially extending rectangular mold cavities 20 that are widened somewhat at their upper portions, as shown at 21. The lower sides of the mold cavities 20 are covered by the lower wall of the trough member 15, except for the mold cavities over the opening 17 at any one time. These mold cavities 20 are preferably closed at their upper ends except for the small openings 22.

Above the mold block 19 and resting thereon for rotation therewith is a large gear 23 provided with gear teeth 24 around its outer edge and having a solid flange 25a pierced by the openings 25 corresponding to the openings 22 in the mold block 19. Above the gear 23 and resting on the hub thereof is a rotary guide plate 26 provided with suitable openings 27 around its outer edge corresponding to the openings 25 and 22.

Plungers or pistons 28, to which are rigidly fixed the rods 29, are arranged in each of the mold cavities 20 for vertical movement, and are preferably constructed to fit snugly within the mold cavity openings 20. The rods 29 project through the openings 22 in the mold cavity block 19, the openings 25 in the flange of gear 23, and the openings 27 in the guide plate 26. Collars 30 may be adjustably secured to the rods 29 to limit upward movement of the rods and their respective plungers 28. Vertical movement of the rods in a downward direction may similarly be limited by means of the adjustably secured collars 31 on rods 29 which strike against the flange 25a of the gear 23 in the lowermost position of the plungers 28. The upper ends of rods 29 may be provided with suitable rotary cam followers 32, for a purpose to be described.

The gear 23, together with the mold block 19, rods 29, plungers 28 and guide plate 26, is rotated about the column 13 by means of a small spur gear 33 fixed to the end of the shaft 34 projecting through the top of bearing 16. The teeth of the spur gear 33 mesh with the teeth 24 on the large gear 23. Shaft 34 may be driven by any suitable means, such as the speed reducing mechanism 35, which in turn is driven from the motor 36 by means of the belt 37.

The cam followers 32 are utilized for discharging the molded product from the mold cavities 20, and for this purpose a double acting cam 38 provided with an upper cam surface 39 and a lower cam surface 40 may be fixed to the upper end of the column 13 by means of the collar 40a. As the rods 29 are rotated, the cam followers 32 engage the surface 39 which forces the rods 29 and plungers 28 progressively downward to discharge the molded blocks 41 of the product being treated. The lower surface 40 of the cam prevents the blocks 41 from being discharged too rapidly due to the weight of the plungers 28 and rods 29.

Because the blocks of molded product do not drop clear and free by gravity from the plungers 28, it has been found desirable to utilize a cut-off mechanism to complete this discharging operation. As the blocks 41 are cut off and released from the molding machine, they may be deposited on a continuously moving belt conveyor 42 located just below the discharge station of the molding apparatus.

Referring to Figures 1, 6, 7 and 8, the cut-off mechanism may comprise a reciprocating slide 43 having arms 44 spread apart a sufficient distance to straddle the discharged block of product. Between these upwardly extending arms 44, a stainless steel wire 45 or similar cutting element is stretched in place by means of the clamp 46.

The slide 43 may be mounted for reciprocation in suitable guides 47, 48 that are fixed to the lower surface of the trough member 15. One end of the slide 43 may have adjustably secured thereto, as by means of the plate 49 and nuts 50, a rod 51 carrying a piston 52 within the cylinder 53. Air or other fluid medium may be supplied to the cylinder 53 under pressure through the pipes 54 or 55 to move the piston 52 and rod 51 together with slide 43 in one direction or the other.

The cut-off mechanism is preferably operated automatically, and for this purpose a valve 56 may be attached to the under surface of the cam 38 just above the notches 57 cut in the ring 58 that is fixed to or formed integral with the guide plate 26. A suitable follower 59 may be pivotally supported, as by means of the pin 60, on the body of valve 56, carrying on one end a detent 61 shaped to enter the notches 57 in the ring 58. A sliding member of the valve 56 which directs the flow of compressed air through first one and then the other of the pipes 62, 63 may have a projecting section 64 held against the follower 59 by a spring or other suitable means inside the valve. Compressed air may be supplied from any source (not shown) to the valve 56 through the tube 65.

The position of the valve 56 relative to the cam 38 may be varied by means of the hand screw 66. It will be apparent, of course, that pipe 62 of the valve 56 is connected to the pipe 54 of the cut-off mechanism, and that pipe 63 is connected to pipe 55 of the cut-off mechanism.

Figure 2:
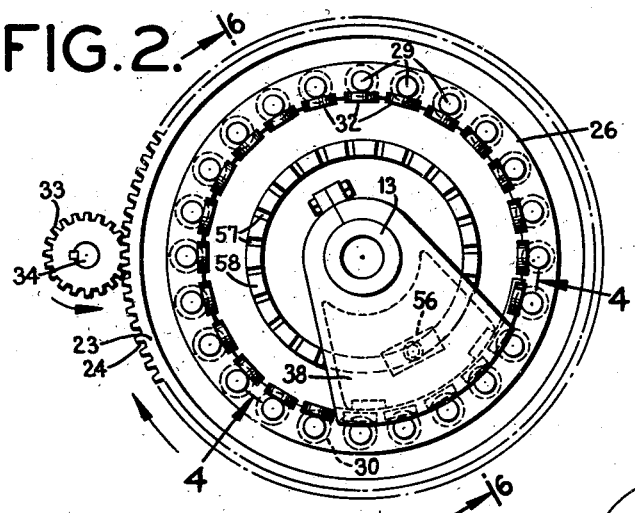
Figure 2 is a plan view of the molding apparatus taken on the line 2—2 of Figure 1.
Figure 5:
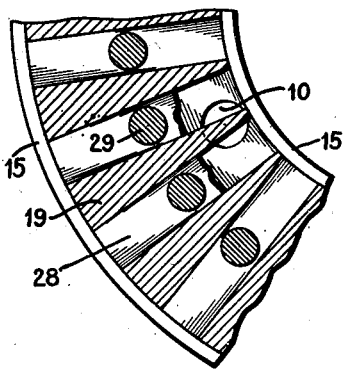
Figure 5 is a fractional view of a detail of the apparatus in horizontal section on an enlarged scale.
Figure 3:
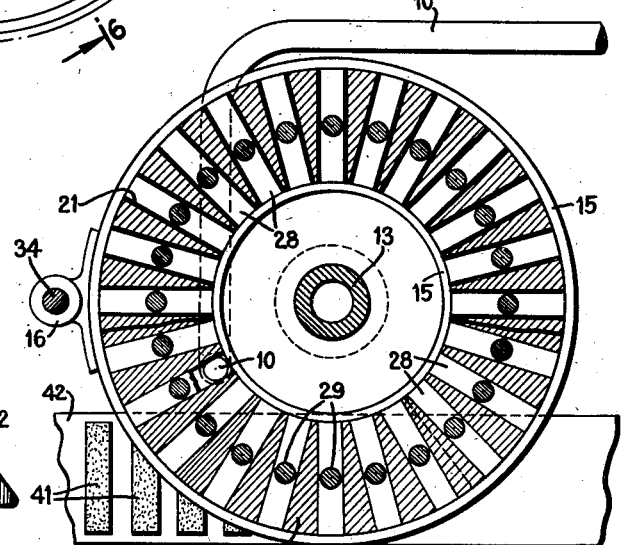
Figure 3 is a horizontal sectional view through the apparatus taken on the line 3—3 of Figure 1.

In the operation of this device for molding margarine, the super-cooled liquid margarine is delivered in a continuous stream from the freezer 11 through the pipe 10 to the inlet station 18. This liquid is delivered under just sufficient pressure to raise the plungers 28 and rods 29 in the mold cavities 20. The motor 36 is started, and through the speed reducing mechanism 35, shaft 34, gear 33 and gear 23, the mold block 19, plungers 28, rods 29, guide plate 26 and ring 58 are caused to rotate slowly and continuously in a clockwise direction, as viewed in Figs. 2 and 3. As a given mold cavity 20 approaches the feeding station for the liquid material to be molded, this liquid flows into the mold cavity and raises the plunger 28 in this cavity and the rod 29 connected thereto until the collar 33 strikes against the guide ring 26. By the time this mold cavity 20 has been completely filled and the plunger and rod raised to this point, the next mold cavity 20 is partly over the inlet opening from the pipe 10, as shown in Fig. 5, and the super-cooled liquid thus readily flows into the next mold cavity 20. The mold just filled continues to rotate around the machine and the liquid emulsion in the mold cavity 20 gradually solidifies to form a solid block therein. The speed of the machine, of course, is preferably regulated so that the liquid in the mold cavities has sufficient time to solidify in the form of a solid block before reaching the discharge station.

Figure 4:
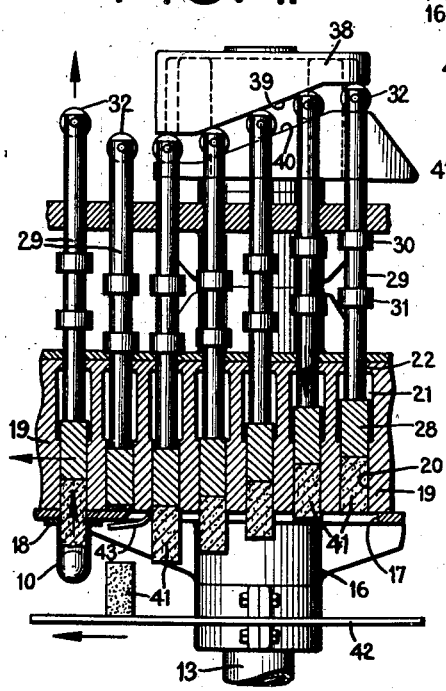
Figure 4 is a developed vertical sectional view of a portion of the apparatus taken on the arcuate line 4—4 of Figure 2.
Figure 6:
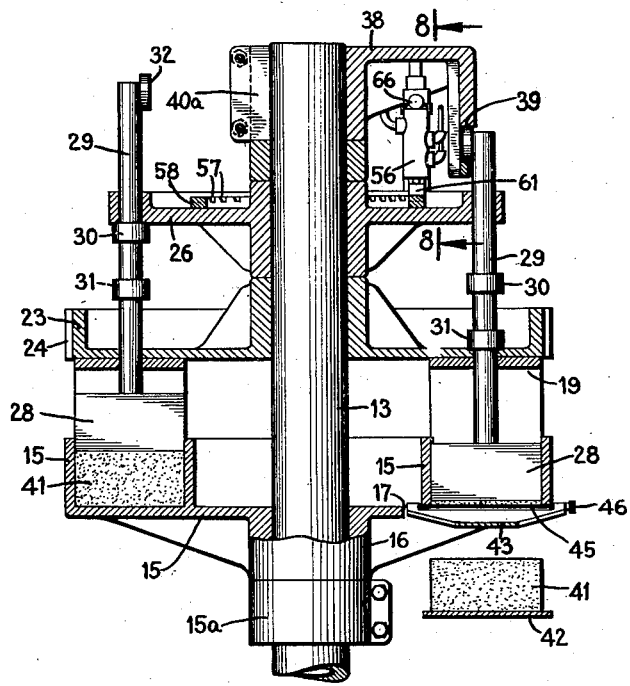
Figure 6 is a vertical sectional view through the upper portion of the apparatus taken on the line 6—6 of Figure 2.
Figure 7:
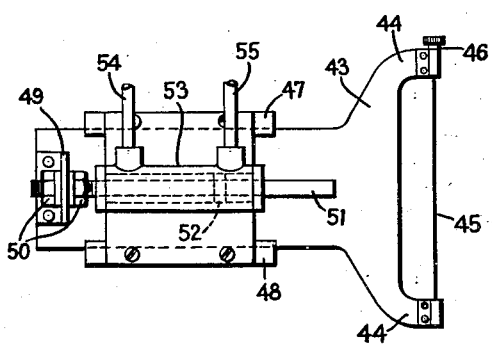
Figure 7 is a bottom plan view on an enlarged scale of a cutting mechanism taken on the line 7—7 of Figure 1.
Figure 8:
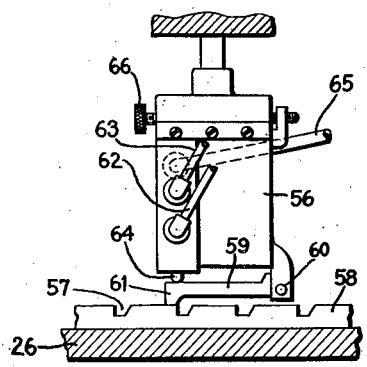
Figure 8 is a fractional detail view showing a valve for operating the cutting mechanism and taken on the line 8—8 of Figure 6.

As the filled mold cavity completes about three-quarters of a revolution or slightly more after being filled, it reaches a point above one side of the open space 17 in the trough member 15, and simultaneously the cam follower 32 on rod 29 engages the upper surface 39 of the cam 38. Continued rotation causes the cam 38 to force the rod 29 downward, and the plunger 28 thus forces the hardened block of margarine down to the lowermost position shown in Fig. 4. As the block reaches this lowermost position, one of the notches 57 is brought into alinement with the detent 61 on the follower 59 of the valve 56, and this follower drops a sufficient distance to permit compressed air to be discharged through the pipe 62 to the pipe 54. This in turn forces the slide 43 forward in a direction opposite to the direction of rotation of the mold block 19, and the wire 45 cuts off the hanging block 41 of margarine so that it drops onto the conveyor belt 42.

The apparatus is preferably adjusted so that a small amount of margarine is left on the lower surface of the plunger 28, and this small amount of solidified margarine is simply carried around and around with the apparatus.

By reason of the sharp inclining of one side of the detent 61 and of the corresponding sides of notches 57, the follower 59 is promptly raised as the mold block continues rotation, and the compressed air through pipe 62 is cut off and directed through the pipe 63. This, in turn, is transmitted to the pipe 55 which withdraws the slide 43 and cutting wire 45 into position for the next cut-off operation.

It has been found that this molding apparatus and method is particularly effective for use in combination with a device for super-cooling a continuous stream of a fatty product such as margarine because it makes it possible to keep the super-cooled product in constant motion under less pressure and thus reduces the tendency towards premature hardening. In addition, this invention eliminates the solidification of the liquid in layers or stratification and the other difficulties associated with the use of a long chamber for solidification.

A further advantage of this molding apparatus and method is the closer control and greater accuracy in the size and weight of the molded blocks that can be obtained. By feeding the material into the molds in the form of a super-cooled liquid, instead of as a solid material, the molded product obtained is more homogeneous and compact, and each mold is completely filled without air voids.

The terms and expressions which have been employed are used as terms of description and not of limitation, and there is no intention, in the use of such terms and expressions, of excluding any equivalents of the features shown and described or portions thereof, but recognize that various modifications are possible within the scope of the invention claimed.

What is claimed is:

1. Apparatus for molding congealed products comprising a plurality of molds arranged in a closed path, plungers in said molds, means for feeding a continuous stream of a liquid chilled below its melting point into said molds to raise the plungers therein, and adjustable means for limiting the extent to which said plungers are raised by said liquid.

2. Apparatus for molding congealed edible fatty products comprising a rotary mold block having a plurality of mold cavities formed therein open on their lower sides, a fixed plate covering the openings of at least certain of said mold cavities, movable plungers in said cavities, means for limiting the upward movement of said plungers, means for feeding liquid to be congealed into said cavities while they are over said plate and thereby raise said plungers, and means for operating said plungers to eject congealed blocks from said mold cavities.

3. Apparatus for preparing molded blocks of congealed fatty material comprising in combination means for chilling a continuous stream of liquid fatty material to a temperature below its melting point without allowing said material to harden, a plurality of molds, means for feeding said stream of chilled liquid under pressure successively into said molds, and means for discharging congealed blocks of said material from said molds.

4. Apparatus for molding congealable products comprising a plurality of molds arranged for movement through a closed path, means for feeding under pressure a continuous stream of supercooled liquid successively to said molds, and ejector plungers in said molds arranged to be raised by the flow of such liquid into the molds.

5. Apparatus for making molded blocks of congealed fatty material comprising in combination means for chilling liquid fatty material to a temperature below its melting point without allowing the material to congeal, a mold block having a plurality of mold cavities therein, means for feeding a stream of super-cooled material from said chilling means to successive mold cavities without interrupting the flow of said stream, and ejector plungers in said cavities arranged to be raised a predetermined distance by the flow of said material into said mold cavities.

BETTY A. SCHAUB,
*Executrix of the Last Will and Testament of Jacob Schaub, Deceased.*